United States Patent
Hirukawa et al.

(10) Patent No.: US 11,097,607 B2
(45) Date of Patent: Aug. 24, 2021

(54) ELECTRIC VEHICLE

(71) Applicant: HONDA MOTOR CO., LTD., Tokyo (JP)

(72) Inventors: Masayuki Hirukawa, Wako (JP); Naoki Matsumoto, Wako (JP); Makoto Hotozuka, Wako (JP); Hisao Nishiura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/629,051

(22) PCT Filed: Jul. 25, 2018

(86) PCT No.: PCT/JP2018/027873
§ 371 (c)(1),
(2) Date: Jan. 7, 2020

(87) PCT Pub. No.: WO2019/044291
PCT Pub. Date: Mar. 7, 2019

(65) Prior Publication Data
US 2020/0189379 A1  Jun. 18, 2020

(30) Foreign Application Priority Data
Aug. 31, 2017  (JP) .............................. JP2017-167376

(51) Int. Cl.
*B60K 1/04*  (2019.01)
*B60L 50/60*  (2019.01)
(Continued)

(52) U.S. Cl.
CPC ................ *B60K 1/04* (2013.01); *B60L 50/66* (2019.02); *B60R 16/0207* (2013.01);
(Continued)

(58) Field of Classification Search
CPC ............ B60K 1/04; B60L 50/66; B62D 25/20
See application file for complete search history.

(56) References Cited

U.S. PATENT DOCUMENTS 8,267,205 B2 *  9/2012  Ishii .................. B60K 17/30
                                                          180/6.44
10,149,430 B2 * 12/2018  Bergstrom ............. B60L 1/003
(Continued)

FOREIGN PATENT DOCUMENTS

EP          0539269       4/1993
JP          05-112270     5/1993
(Continued)

OTHER PUBLICATIONS

International Preliminary Report on Patentability for International Application Serial No. PCT/JP2018/027873 dated Dec. 17, 2019, 10 pages.

(Continued)

*Primary Examiner* — John D Walters
*Assistant Examiner* — James J Triggs
(74) *Attorney, Agent, or Firm* — Amin, Turocy & Watson, LLP

(57) ABSTRACT

An electric vehicle includes: a seat on which an occupant is seated; a pair of right and left batteries that are arranged in a distributed manner to a right and a left below the seat; and a pair of right and left battery support parts which are provided on a vehicle body and each of which detachably holds each of the right and left batteries.

5 Claims, 8 Drawing Sheets

(51) Int. Cl.
  *B60R 16/02* (2006.01)
  *B60R 16/023* (2006.01)
  *B62D 25/20* (2006.01)

(52) U.S. Cl.
  CPC .......... *B60R 16/0238* (2013.01); *B62D 25/20* (2013.01); *B60K 2001/0422* (2013.01); *B60Y 2200/91* (2013.01)

(56) References Cited

U.S. PATENT DOCUMENTS

| | | | | |
|---|---|---|---|---|
| 2005/0126145 | A1* | 6/2005 | Hunt | B60K 7/0007 56/11.9 |
| 2009/0000839 | A1* | 1/2009 | Ishii | B60L 8/003 180/65.51 |
| 2010/0101885 | A1 | 4/2010 | Nozaki et al. | |
| 2011/0300427 | A1 | 12/2011 | Iwasa et al. | |
| 2015/0165900 | A1 | 6/2015 | Gagnon | |
| 2016/0014954 | A1* | 1/2016 | Dwyer | F02D 41/021 56/10.2 J |
| 2017/0174069 | A1 | 6/2017 | Oyama et al. | |
| 2017/0265395 | A1* | 9/2017 | Kuriyagawa | A01D 34/74 |
| 2019/0075724 | A1* | 3/2019 | Becke | H01M 50/20 |

FOREIGN PATENT DOCUMENTS

| | | |
|---|---|---|
| JP | 10-056701 | 2/1998 |
| JP | 2001-045606 | 2/2001 |
| JP | 2003-235905 | 8/2003 |
| JP | 2004-106807 | 4/2004 |
| JP | 2009-061915 | 3/2009 |
| JP | 2012-151916 | 8/2012 |
| JP | 2013-067381 | 4/2013 |
| JP | 2013-147153 | 8/2013 |
| JP | 2014-094617 | 5/2014 |
| JP | 2017-114341 | 6/2017 |

OTHER PUBLICATIONS

International Search Report and Written Opinion for International Application Serial No. PCT/JP2018/027873 dated Oct. 30, 2018, 10 pages.

* cited by examiner

ELECTRIC VEHICLE

TECHNICAL FIELD

The present invention relates to an electric vehicle.

Priority is claimed on Japanese Patent Application No. 2017-167376, filed on Aug. 31, 2017, the contents of which are incorporated herein by reference.

BACKGROUND

In the related art, an electric vehicle is known on which a plurality of batteries are mounted (for example, refer to Patent Document 1). In this technique, a center console arranged between a pair of left and right rear seats 24L, 24R is arranged to extend rearward from a driver's seat 23 at a center in a right-to-left direction of a vehicle body, some batteries 51A to 51C among the plurality of batteries 51A to 51F are arranged below the driver's seat 23, and the other batteries 51D to 51F among the plurality of batteries 51A to 51F are arranged behind the driver's seat 23, below the center console, and below the pair of left and right rear seats 24L, 24R.

RELATED ART DOCUMENTS

Patent Documents

[Patent Document 1]
Japanese Unexamined Patent Application, First Publication No. 2014-94617

SUMMARY OF INVENTION

Problems to be Solved by the Invention

In the above technique of the related art, high-voltage electric components (a DC-DC converter 62 and a main contactor 63) and low-voltage electric components (a vehicle control ECU 64 and a motor control ECU 65) are arranged in a distributed manner to right and left outer sides of the plurality of batteries arranged at the center in the right-to-left direction of the vehicle body.

However, in consideration of improvement of travel stability, avoidance of heat source concentration of the battery, and mobilization of the battery, further improvement is demanded.

An aspect of the present invention provides an electric vehicle that is capable of improving travel stability, avoiding heat source concentration of a battery, and facilitating mobilization of a battery.

Means for Solving the Problem (1) An electric vehicle according to an aspect of the present invention includes: a seat on which an occupant is seated; a pair of right and left batteries that are arranged in a distributed manner to a right and a left below the seat; and a pair of right and left battery support parts which are provided on a vehicle body and each of which detachably holds each of the right and left batteries.

(2) In the electric vehicle described above, the right battery may be detachable from the right battery support part by a movement in a right-to-left direction, and the left battery may be detachable from the left battery support part by a movement in a right-to-left direction.

(3) The electric vehicle described above may include a propeller shaft that extends in a front-to-rear direction on an inner side in a vehicle width direction, and the right and left batteries may be arranged to interpose the propeller shaft in a right-to-left direction.

(4) The electric vehicle described above may include: a step floor on which an occupant places his or her foot; and a step frame that supports the step floor, wherein the step frame may have an outer arrangement part that is arranged on an outer side in a vehicle width direction of the right and left batteries, and a rear arrangement part that is arranged behind the right and left batteries may continue behind the outer arrangement part.

(5) The electric vehicle described above may include: an electric motor that is connected to a drive wheel; and a second battery that is arranged behind the seat, wherein at least part of the electric motor may be arranged between the seat and the second battery.

Advantage of the Invention

According to the configuration (1) described above, since the battery is arranged in a distributed manner to the right and the left in a dead space below the seat, the capacity of the battery can be easily increased, and travel stability, particularly in a rolling direction, can be improved according to the distributed arrangement to the right and the left of the battery which is a heavy object. Further, according to the distributed arrangement to the right and the left of the battery, heat radiation of the battery can be dispersed, and heat source concentration of the battery can be avoided. Further, the battery can be easily attached and detached from an outer side in the vehicle width direction, and mobilization of the battery can be facilitated.

According to the configuration (2) described above, since the right and left batteries are detachable by the movement in the right-to-left direction, in comparison with a configuration in which the right and left batteries are detachable by a movement in a vertical direction, the battery support part can easily receive a weight of the battery when the battery is attached and detached, and the attachment and detachment work of the battery which is a heavy object can be facilitated.

According to the configuration (3) described above, since the right and left batteries are arranged in a distributed manner to the right and the left of the propeller shaft on an inner side in the vehicle width direction, an efficient layout of the right and left batteries, particularly in a four-wheel drive vehicle, can be realized.

According to the configuration (4) described above, since the right and left batteries are arranged on an inner side in the vehicle width direction of the outer arrangement part of the step frame and are arranged in front of the rear arrangement part, external disturbances to the right and left batteries from the outside in the vehicle width direction and from the rear can be prevented by using a frame member including the step frame.

According to the configuration (5) described above, at least part of the electric motor is arranged between the seat and the second battery in the vehicle front-to-rear direction. Thereby, the electric motor is arranged adjacent to the right and left batteries and the second battery, and the electric motor is arranged to be surrounded by the plurality of batteries. Therefore, an efficient layout in which distances between the plurality of batteries and the electric motor are reduced can be achieved, and mass concentration can be achieved.

DESCRIPTION OF THE EMBODIMENTS

Figure 1:
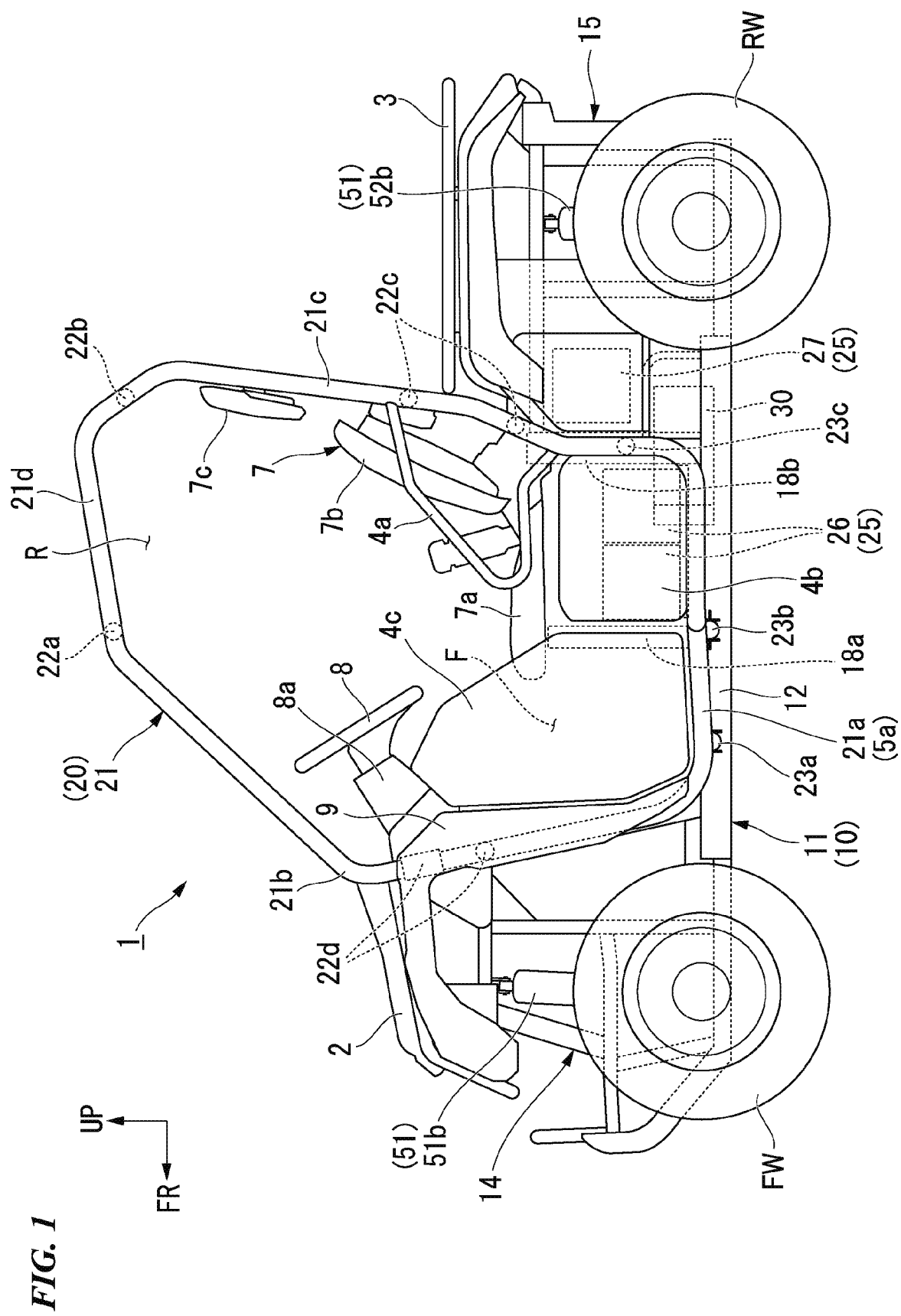
FIG. 1 is a left side view of an electric vehicle according to an embodiment of the present invention.

Hereinafter, an embodiment of the present invention will be described with reference to the drawings. Directions such as frontward, rearward, rightward, and leftward in the following description are the same as those in a vehicle described below unless otherwise specified. Further, at appropriate places in the drawings used for the following description, an arrow FR indicating frontward in the vehicle, an arrow LH indicating leftward in the vehicle, an arrow UP indicating upward in the vehicle, and a line CL indicating a center in a right-to-left direction of a vehicle body are shown.

<Entire Vehicle>

Figure 2:
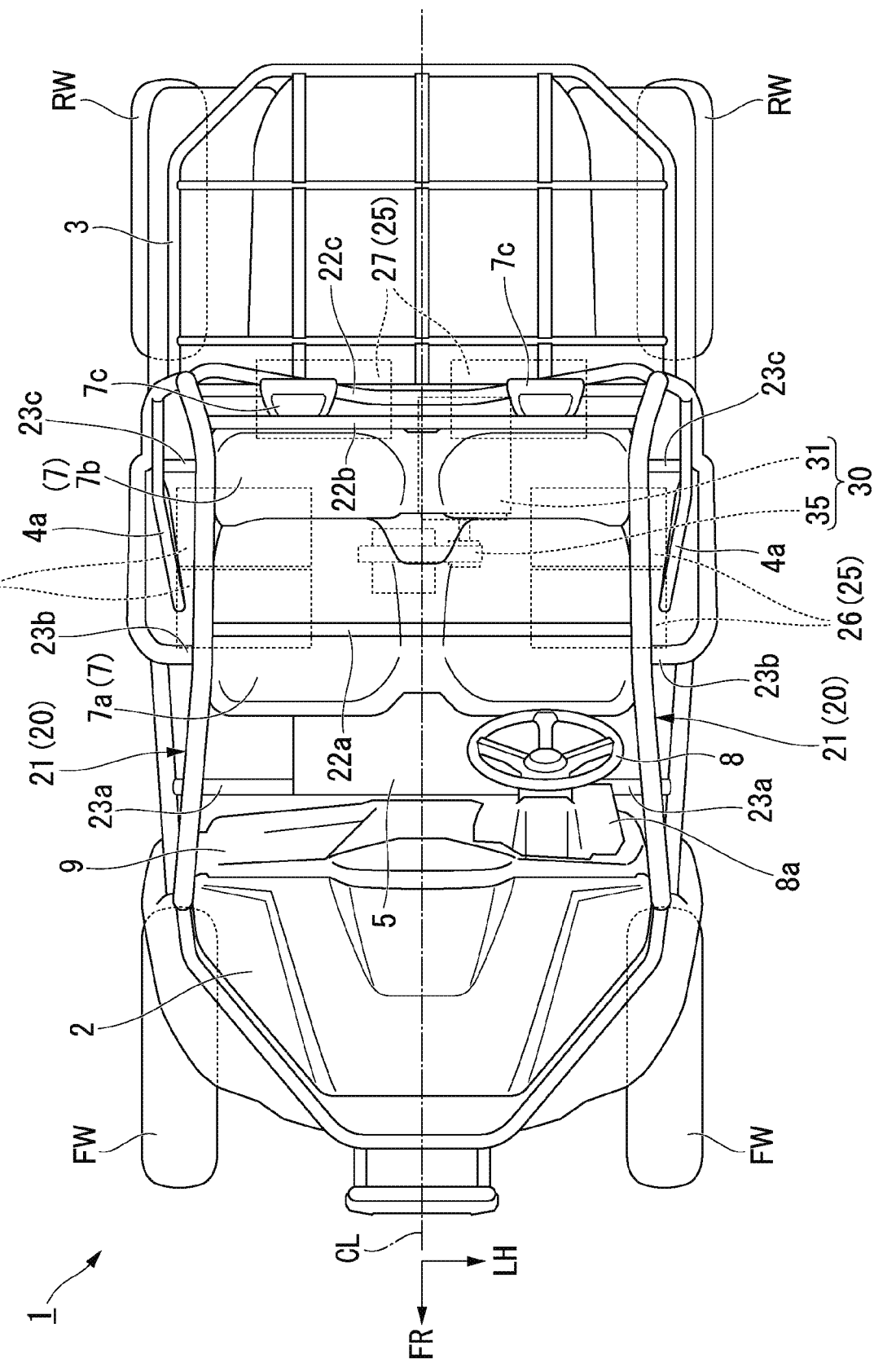
FIG. 2 is a top view of the electric vehicle.

An electric vehicle 1 shown in FIG. 1 and FIG. 2 includes a pair of right and left front wheels FW as steerable wheels and drive wheels on both right and left sides of a front part of a vehicle body and includes a pair of right and left rear wheels RW as drive wheels on both right and left sides of a rear part of the vehicle body. For example, the electric vehicle 1 of the present embodiment is a relatively small four-wheel vehicle (MUV: Multi-Utility Vehicle) having a main purpose of traveling on an irregular ground such as a waste land. The electric vehicle 1 is not limited to the MUV.

The electric vehicle 1 includes a roll bar 20 as an upper body that defines a riding space R. A seat 7 having a seat body 7a and a backrest 7b is arranged in the riding space R. The seat 7 includes a pair of right and left seat surfaces. A dashboard 9 is arranged in front of the seat 7 with a foot space F therebetween. A steering wheel 8 is arranged on one (for example, the right side) of right and left sides of the dashboard 9. A loading platform 3 is arranged behind the riding space R (behind the seat 7). A bonnet 2 is arranged in front of the riding space R. A pair of right and left guard pipes 4a are arranged on right and left sides of the seat 7. A pair of right and left side panels 4b are arranged below the right and left guard pipes 4a. Side doors 4c are arranged on right and left sides of the foot space F.

The roll bar 20 includes a pair of right and left loop-shaped parts 21, front and rear cross frames 13a, 13b that connect between the right and left loop-shaped parts 21 at a roof part of the roll bar 20, a rear frame 16 that supports the backrest 7b of the seat 7 from behind at a rear part of the roll bar 20 and that supports right and left headrests 7c which are independent from each other, and a front frame 14 that supports the dashboard 9 and a steering column at a front part of the roll bar 20.

The loop-shaped part 21 continuously forms a lower side portion 21a (outer arrangement part) that is arranged substantially horizontally in a side view, a front upward extension portion 21b that bends from a front end portion of the lower side portion 21a and extends upward, a rear upward extension portion 21c (rear arrangement part) that bends from a rear end portion of the lower side portion 21a and extends upward, and an upper side portion 21d that extends between an upper end portion of the front upward extension portion 21b and an upper end portion of the rear upward extension portion 21c. The lower side portion 21a is included in a step frame 5a. The lower side portion 21a supports a step floor 5 on which an occupant places his or her foot.

<Vehicle Body Frame>

Figure 3:
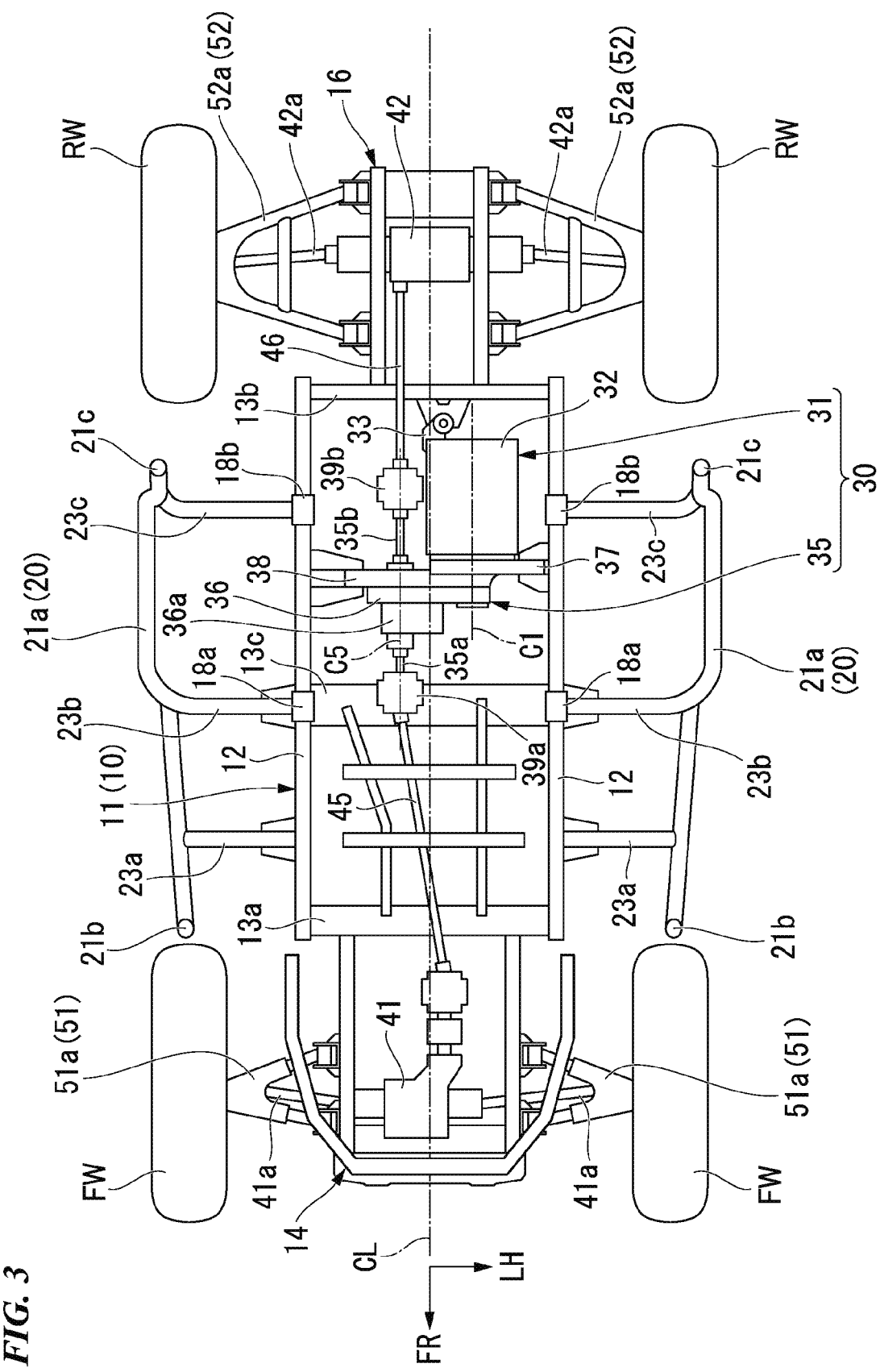
FIG. 3 is a top view showing a power transmission system from a drive source of the electric vehicle.

With reference to FIG. 1 and FIG. 3, the roll bar 20 is mounted on a vehicle body frame 10 as a lower body on which a drive system component is mounted.

The vehicle body frame 10 is formed by integrally joining steel material pieces of a plurality of types by welding or the like. The vehicle body frame 10 includes a main frame 11 having a frame shape in a plan view including a pair of right and left side frames 12, the front frame 14 that is coupled to a front part of the main frame 11, and the rear frame 16 that is coupled to a rear part of the main frame 11.

A drive apparatus 30 that includes an electric motor 31 which is a drive source of the electric vehicle 1 is mounted on the main frame 11. A front differential mechanism 41 is mounted on the front frame 14. A rear differential mechanism 42 is mounted on the rear frame 16. The front differential mechanism 41 is connected to the drive apparatus 30 via a front propeller shaft 45 such that power can be transmitted to the drive apparatus 30. The rear differential mechanism 42 is connected to the drive apparatus 30 via a rear propeller shaft 46 such that power can be transmitted to the drive apparatus 30. A front suspension apparatus 51 that suspends the right and left front wheels FW is supported on the front frame 14. A rear suspension apparatus 52 that suspends the right and left rear wheels RW is supported on the rear frame 16.

Front and rear seat support frames 18a, 18b having a height are fixed to the main frame 11. The seat 7 is supported on the front and rear seat support frames 18a, 18b via a substantially horizontal support frame 18c (refer to FIG. 5 and FIG. 6). The seat 7 is arranged at substantially a middle in a vehicle front-to-rear direction above the main frame 11 to be spaced from the main frame 11. A battery 25 that supplies electric power to the electric motor 31 of the drive apparatus 30 is mounted in a space ranging from a position below the seat 7 to a position behind and below the seat 7. The battery 25 is constituted of a plurality of unit batteries 25a.

A junction box 61 that collects unit wirings 61a which extend from the plurality of unit batteries 25a is arranged below the seat 7. A PDU (power driver unit) 62 to which a collective wiring 61b that extends from the junction box 61 is connected is arranged behind the junction box 61. An ECU (electric control unit) 66 that drives and controls the electric motor 31 via the PDU 62 is arranged above the PDU 62. For example, the PDU 62 and the ECU 66 constitute an integrated control unit 66U (refer to FIG. 8).

The main frame 11 includes the pair of right and left side frames 12 made of, for example, a square steel pipe, a front cross frame 13a that connects between front end parts of the right and left side frames 12, a rear cross frame 13*b* that connects between rear end parts of the right and left side frames 12, and an intermediate cross frame 13*c* that connects between front-to-rear intermediate parts of the right and left side frames 12 closer to a front part of the right and left side frames 12. The term "intermediate" used in the present embodiment indicates not only a middle between both ends of an object but also includes an intermediary range between both ends of an object.

The lower side portion 21*a* of the right loop-shaped part 21 of the roll bar 20 is connected to a right outer side of the right side frame 12 via front and rear connection frames 23*a*, 23*b* that extend in a right-to-left direction. The lower side portion 21*a* of the left loop-shaped part 21 of the roll bar 20 is connected to a left outer side of the left side frame 12 via front and rear connection frames 23*a*, 23*b* that extend in the right-to-left direction. A lower portion of the rear upward extension portion 21*c* of the right loop-shaped part 21 of the roll bar 20 is connected to a right outer side of the rear seat support frame 18*b* via a rear upper connection frame 23*c* that extends in the right-to-left direction. A lower portion of the rear upward extension portion 21*c* of the left loop-shaped part 21 of the roll bar 20 is connected to a left outer side of the rear seat support frame 18*b* via a rear upper connection frame 23*c* that extends in the right-to-left direction.

Figure 5:
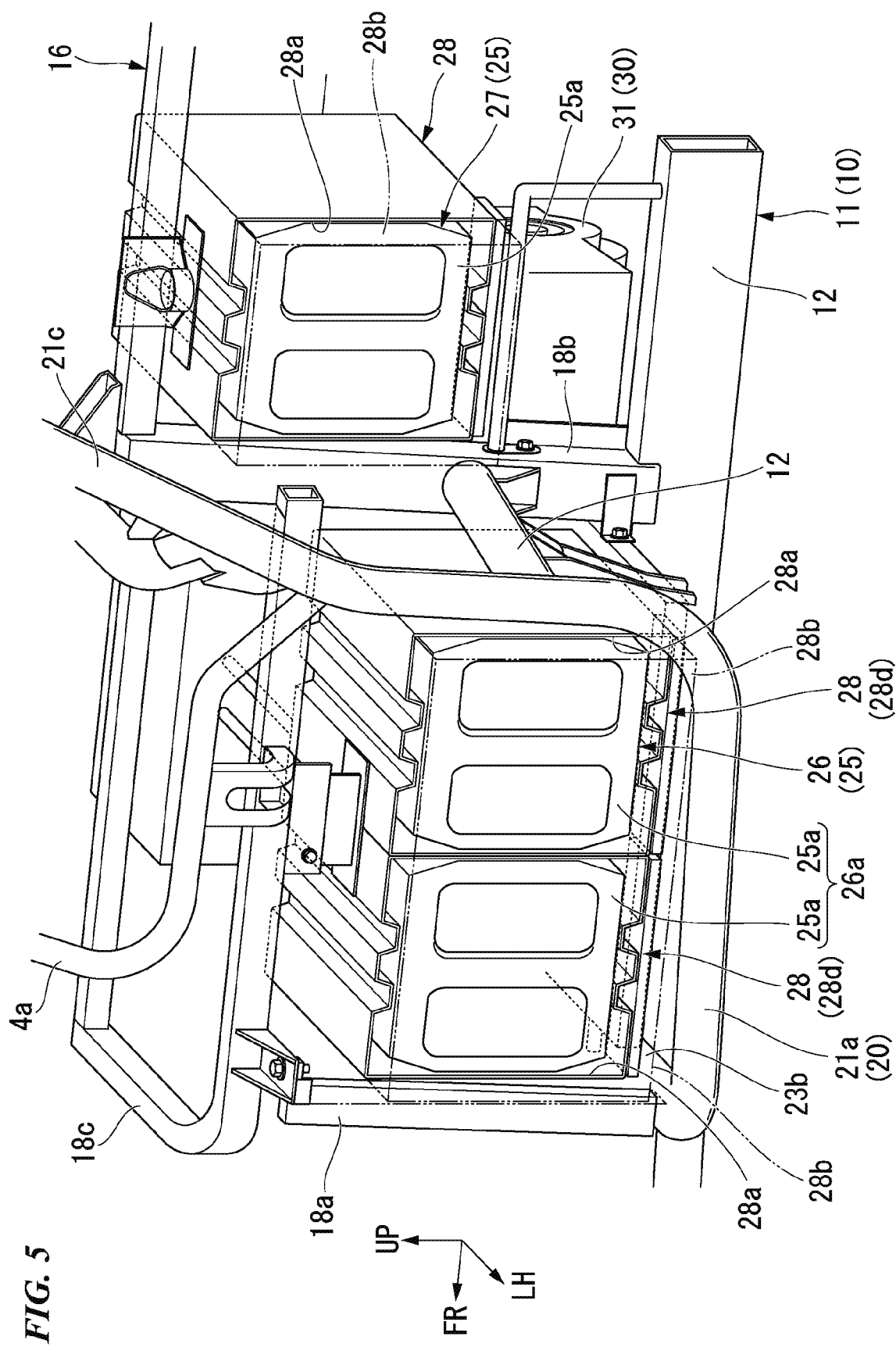
FIG. 5 is a perspective view showing surroundings of a battery and a battery case on a left side of a vehicle body of the electric vehicle.
Figure 6:
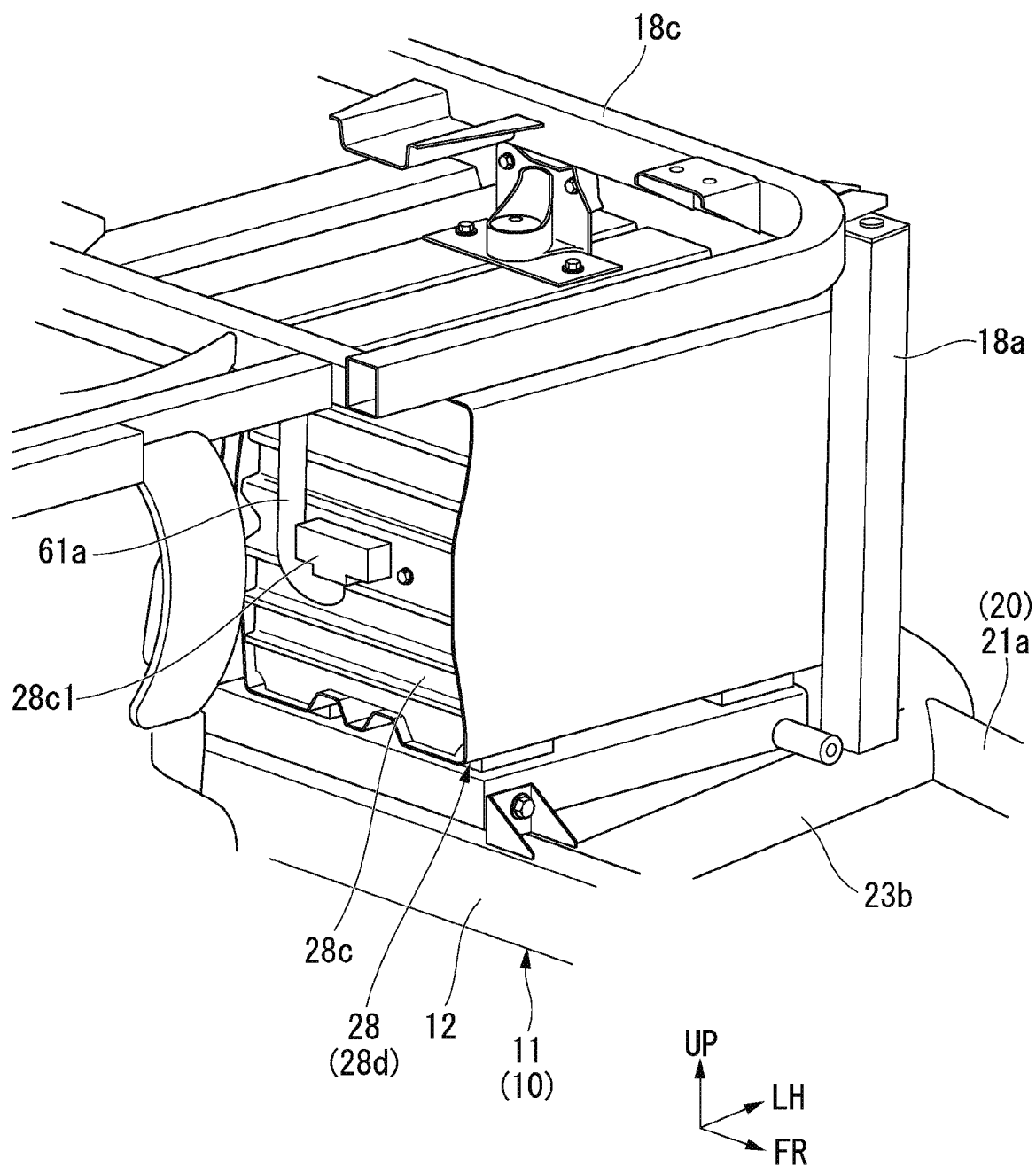
FIG. 6 is a perspective view showing an inner side in a vehicle width direction of the battery case.

With reference also to FIG. 5, the loop-shaped part 21 has the lower side portion 21*a* which is an outer arrangement part that is arranged on an outer side in a vehicle width direction of a unit battery pair 26*a* (a pair of right and left batteries) of the battery 25, which will be described later, and the rear upward extension portion 21*c* which is a rear arrangement part that is arranged behind the unit battery pair 26*a*. Further, the rear upper connection frame 23*c* is arranged behind the unit battery pair 26*a*. These frame members prevent external disturbances from reaching the unit battery pair 26*a*.

With reference to FIG. 1 and FIG. 3, the front frame 14 forms a box structure having a right-to-left width narrower than that of the main frame 11 and a height higher than that of the main frame 11 as a whole.

The front differential mechanism 41 is mounted inside the front frame 14. An inner end part of a right suspension arm 51*a* of the front suspension apparatus 51 is supported on a right side part of the front frame 14 to be vertically swingable. An inner end part of a left suspension arm 51*a* of the front suspension apparatus 51 is supported on a left side part of the front frame 14 to be vertically swingable. An upper end part of a right cushion unit 51*b* of the front suspension apparatus 51 is supported on an upper side of the right side part of the front frame 14. An upper end part of a left cushion unit 51*b* of the front suspension apparatus 51 is supported on an upper side of the left side part of the front frame 14.

A lower end part of the right cushion unit 51*b* is connected to the right suspension arm 51*a*. A lower end part of the left cushion unit 51*b* is connected to the left suspension arm 51*a*.

The rear frame 16 forms a box structure having a right-to-left width narrower than that of the main frame 11 and a height higher than that of the main frame 11 as a whole. The rear differential mechanism 42 is mounted inside the rear frame 16. An inner end part of a right suspension arm 52*a* of the rear suspension apparatus 52 is supported on a right side part of the rear frame 16 to be vertically swingable. An inner end part of a left suspension arm 52*a* of the rear suspension apparatus 52 is supported on a left side part of the rear frame 16 to be vertically swingable. An upper end part of a right cushion unit 52*b* of the rear suspension apparatus 52 is supported on an upper side of a right side part of the rear frame 16. An upper end part of a left cushion unit 52*b* of the rear suspension apparatus 52 is supported on an upper side of a left side part of the rear frame 16. A lower end part of the right cushion unit 52*b* is connected to the right suspension arm 52*a*. A lower end part of the left cushion unit 52*b* is connected to the left suspension arm 52*a*.

<Drive Apparatus>

Figure 7:
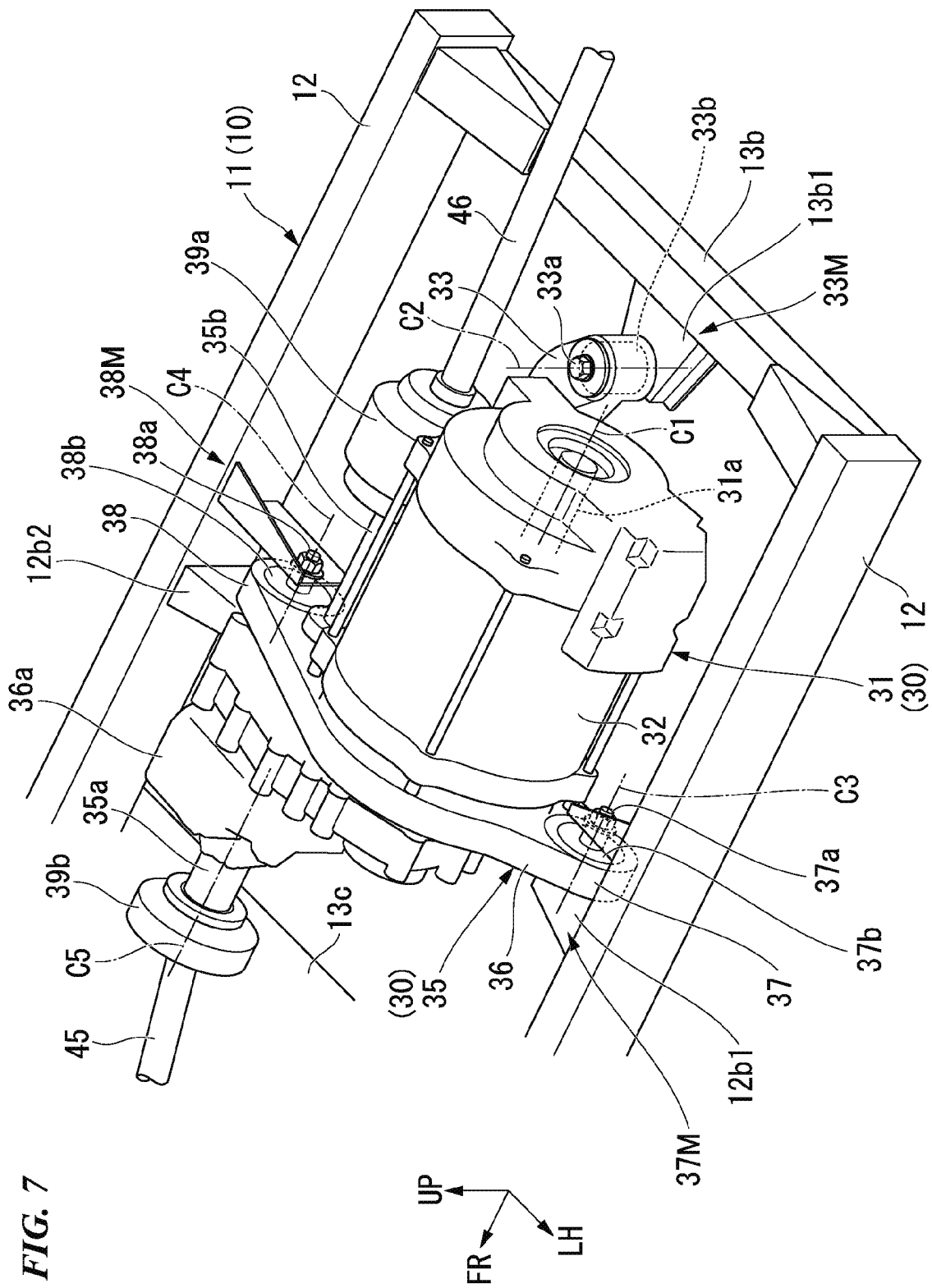
FIG. 7 is a perspective view showing surroundings of a drive apparatus of the electric vehicle.

With reference to FIG. 1, FIG. 3, and FIG. 7, the drive apparatus 30 integrally has an electric motor 31 that is arranged on a left side of a rear part of the main frame 11 and that has a drive axis line (motor axis line) C1 directed in the front-to-rear direction, and a distribution mechanism (transfer) 35 that is provided to extend rightward from a front end part of the electric motor 31 beyond a right-to-left center CL of the vehicle body.

The electric motor 31 is driven by electric power of the battery 25. The electric motor 31 is driven at a variable speed, for example, by a VVVF (variable voltage variable frequency) control. The electric motor 31 performs a shift control so as to have a continuously variable transmission, but is not limited thereto, and may perform a shift control so as to have a stepped transmission.

The electric motor 31 includes a cylindrical housing 32 having a center at the motor axis line C1. A rear mount part 33 with respect to a motor support part 13*b*1 provided on the rear cross frame 13*b* of the main frame 11 is provided on a vehicle body right-to-left center CL side of a rear end part of the housing 32. The rear mount part 33 is supported (rubber-mounted) on the motor support part 13*b*1 via a bolt 33*a* that extends in a vertical direction and a rubber bush 33*b* through which the bolt 33*a* is inserted. The reference sign C2 indicates an axis line of the bolt 33*a*. A rubber mount part 33M by which a rear part of the housing 32 of the electric motor 31 is supported on the vehicle body frame 10 is constituted to include the motor support part 13*b*1, the rear mount part 33, the bolt 33*a*, and the rubber bush 33*b*.

The distribution mechanism 35 decelerates a drive force of the electric motor 31 and outputs the drive force to the front and rear propeller shafts 45, 46. The distribution mechanism 35 includes a horizontally elongated casing 36 that accommodates a reduction gear or the like. A front end part of the housing 32 of the electric motor 31 is integrally coupled to a left rear part of the casing 36. A left mount part 37 with respect to a left support part 12*b*1 provided on the left side frame 12 of the main frame 11 is provided on a left end part of the casing 36. The left mount part 37 is supported (rubber-mounted) on the left support part 12*b*1 via a bolt 37*a* that extends in the front-to-rear direction and a rubber bush 37*b* through which the bolt 37*a* is inserted. The reference sign C3 indicates an axis line of the bolt 37*a*. A rubber mount part 37M by which a left side part of the casing 36 of the distribution mechanism 35 is supported on the vehicle body frame 10 is constituted to include the left support part 12*b*1, the left mount part 37, the bolt 37*a*, and the rubber bush 37*b*.

A right mount part 38 with respect to a right support part 12*b*2 provided on the right side frame 12 is provided on a right end part of the casing 36. The right mount part 38 is supported (rubber-mounted) on the right support part 12*b*2 via a bolt 38*a* that extends in the front-to-rear direction and a rubber bush 38*b* through which the bolt 38*a* is inserted. The reference sign C4 indicates an axis line of the bolt 38*a*. A rubber mount part 38M by which a right side part of the casing 36 of the distribution mechanism 35 is supported on the vehicle body frame 10 is constituted to include the right support part 12*b*2, the right mount part 38, the bolt 38*a*, and the rubber bush 38*b*.

The drive apparatus 30 is mounted on an inner side of the main frame 11 via the rubber mount part 33M, the rubber mount part 37M, and the rubber mount part 38M which are mount parts at the three locations described above.

A front drive shaft 35a directed in the front-to-rear direction extends frontward from a right side part of the distribution mechanism 35. A rear drive shaft 35b directed in the front-to-rear direction extends rearward from the right side part of the distribution mechanism 35. The front and rear drive shafts 35a, 35b are coaxial with each other. The reference sign C5 indicates an axis line of the front and rear drive shafts 35a, 35b.

A front end part of the front drive shaft 35a is supported by a front bearing part 39a provided on the main frame 11. A rear end part of the front propeller shaft 45 is connected to the front end part via a universal joint. A front end part of the front propeller shaft 45 is connected to the front differential mechanism 41 that is supported by the front frame 14 via a universal joint. A right drive shaft 41a extends from the front differential mechanism 41, and the right drive shaft 41a is connected to the right front wheel FW. A left drive shaft 41a extends from the front differential mechanism 41, and the left drive shaft 41a is connected to the left front wheel FW.

A rear end part of the rear drive shaft 35b is supported by a rear bearing part 39b provided on the main frame 11. A front end part of the rear propeller shaft 46 is connected to the rear end part via a universal joint. A rear end part of the rear propeller shaft 46 is connected to the rear differential mechanism 42 that is supported by the rear frame 16 via a universal joint. A right drive shaft 42a extends from the rear differential mechanism 42, and the right drive shaft 42a is connected to the right rear wheel RW. A left drive shaft 42a extends from the rear differential mechanism 42, and the left drive shaft 42a is connected to the left rear wheel RW.

The front and rear drive shafts 35a, 35b (and eventually, the front and rear propeller shafts 45, 46) of the distribution mechanism 35 and an output shaft 31a of the electric motor 31 are arranged in a distributed manner to a right and a left that interpose the vehicle body right-to-left center CL.

The drive force of the electric motor 31 is transmitted to the right and left front wheels FW via the distribution mechanism 35, the front propeller shaft 45, the front differential mechanism 41, and the right and left drive shafts 41a, and is transmitted to the right and left rear wheels RW via the distribution mechanism 35, the rear propeller shaft 46, the rear differential mechanism 42, and the right and left drive shafts 42a. A clutch case 36a that accommodates a dog clutch which switches between whether or not power is transmitted to the front propeller shaft 45 is attached to a right front part of the distribution mechanism 35.

With reference also to FIG. 2, at least part (a rear part) of the electric motor 31 is arranged between the seat 7 and a second battery 27, which will be described later, of the battery 25 in a plan view. At least part (a front part in the present embodiment) of the electric motor 31 is arranged to overlap the seat 7 (that is, below the seat 7) in a plan view. At least part of (all of in the present embodiment) the distribution mechanism 35 is arranged below the seat 7.

At least part (a lower part in the present embodiment) of the electric motor 31 is arranged to overlap the side frame 12 of the vehicle body frame 10 in a side view and to overlap the cross frames 13a, 13b, and 13c of the vehicle body frame 10 in a front view.

The front and rear differential mechanisms 41, 42 appropriately distribute the drive force transmitted to the right and left drive shafts and the right and left wheels using a differential mechanism accommodated in each housing.

The rear propeller shaft 46 extends in the front-to-rear direction. The front propeller shaft 45 extends obliquely relative to the front-to-rear direction to be positioned on one of right and left sides (on the left side, the same side as that of the electric motor 31) toward a front side. By appropriately setting positions in the right-to-left direction of end parts on the differential mechanism side of the front and rear propeller shafts 45, 46, surroundings of a differential mechanism of an existing vehicle can be diverted, or the front and rear differential mechanisms 41, 42 can be shared.

<Battery>

Figure 4:
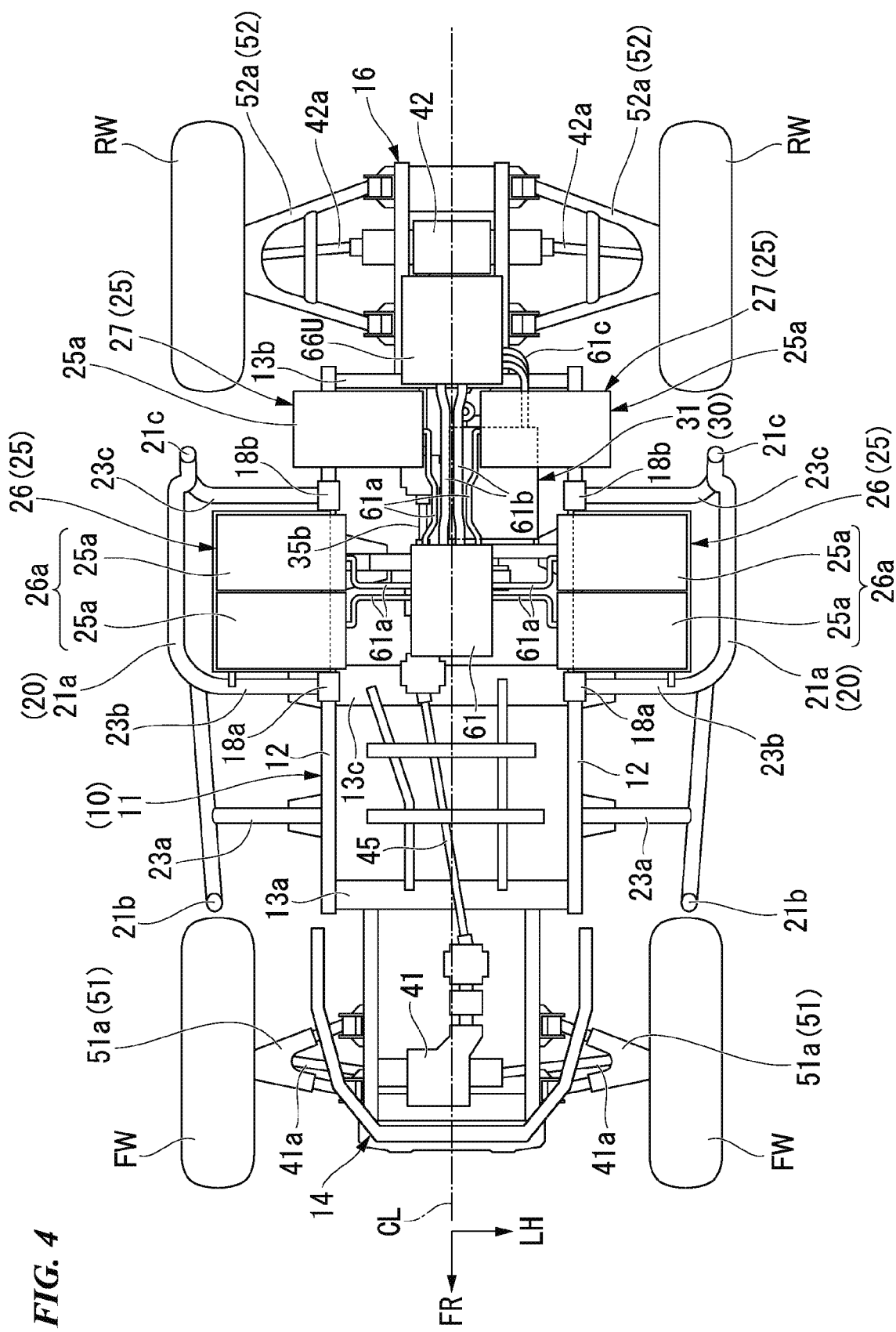
FIG. 4 is a top view showing an electric power supply system to the drive source of the electric vehicle.

With reference to FIG. 4, the battery 25 includes a first battery 26 that is arranged below the seat 7, and a second battery 27 that is arranged behind the first battery 26 (behind and below the seat 7). For example, the first battery 26 and the second battery 27 are constituted to include a plurality of unit batteries 25a that are identical to one another. The unit battery 25a defines a rectangular parallelepiped shape having a right-to-left direction as a longitudinal direction. The unit battery 25a is a mobile battery that can be attached to and detached from the vehicle body.

The first battery 26 includes a pair of front and rear unit batteries 25a (hereinafter, referred to as the unit battery pair 26a) in each of the right and left side parts of the vehicle body. That is, the first battery 26 includes a total of four unit batteries 25a. The right and left unit battery pairs 26a are arranged below the seat 7. The right and left unit battery pairs 26a are arranged close to each other such that a pair of front and rear unit batteries 25a are in contact with each other. The right and left unit battery pairs 26a are separated from each other in the right-to-left direction.

The junction box 61 is arranged in a space between the right and left unit battery pairs 26a. The junction box 61 is arranged above at least part (for example, the distribution mechanism 35) of the drive apparatus 30. The ECU 66 is arranged behind the junction box 61. The PDU 62 is arranged below the ECU 66. The PDU 62 and the ECU 66 constitute the integrated control unit 66U.

In addition to the junction box 61, the unit wirings 61a that branch from the junction box 61 to each unit battery 25a, the collective wiring 61b that extends from the junction box 61 to the PDU 62, and the like are arranged in a space (a space surrounded by the right and left unit battery pairs 26a and the control unit 66U) between the right and left unit battery pairs 26a.

In a plan view, at least part of the front and rear propeller shafts 45, 46 is arranged below the space between the right and left unit battery pairs 26a. That is, the right and left unit battery pairs 26a are arranged in a distributed manner to the right and the left so as to interpose the front and rear propeller shafts 45, 46.

The second battery 27 includes a pair of right and left unit batteries 25a. The right and left unit batteries 25a of the second battery 27 are arranged behind and below the seat 7. The right and left unit batteries 25a of the second battery 27 are separated from each other in the right-to-left direction. A space between the right and left unit batteries 25a of the second battery 27 is narrower than a space between the right and left first batteries 26. For example, in each of the right and left side parts of the vehicle body, a central position in the right-to-left direction of the unit battery 25a of the second battery 27 and an inner end position in the right-to-left direction of the unit battery 25a of the first battery 26 are at substantially the same position in the right-to-left direction. The collective wiring 61b that extends in the front-torear direction from the junction box 61 to the PDU 62 are arranged in a space between the right and left unit batteries 25a of the second battery 27.

The right and left unit batteries 25a of the second battery 27 are arranged to be displaced upward with respect to the right and left unit battery pairs 26a. For example, lower end positions of the right and left unit batteries 25a of the second battery 27 and a central position in the vertical direction of the unit battery 25a of the first battery 26 are at substantially the same position in the vertical direction.

The battery 25 generates a predetermined high voltage (48 to 72 V) by connecting in series between the plurality of unit batteries 25a included in each of the first battery 26 and the second battery 27. Each unit battery 25a is constituted of, for example, a lithium ion battery as a chargeable and dischargeable energy storage. Each unit battery 25a is inserted into and removed from a battery case 28 that is fixed to the vehicle body from the outside in the vehicle width direction. The battery case 28 has a battery insertion and removal port 28a that opens outward in the vehicle width direction, and a lid 28b that opens and closes the battery insertion and removal port 28a. The unit battery 25a is slidably moved in the vehicle width direction from the battery insertion and removal port 28a and is thereby accommodated to be capable of being removed from and inserted into the battery case 28.

The unit wiring 61a corresponding to each unit battery 25a is connected to a wall part 28c on the inner side in the vehicle width direction of the battery case 28. A connection terminal 28c1 is provided on the wall part 28c. The connection terminal 28c1 passes through the wall part 28c, faces the inside of the case, and detachably connects between each unit battery 25a and the unit wiring 61a. The corresponding unit wiring 61a is connected to the connection terminal 28c1. Thereby, each unit battery 25a and the corresponding unit wiring 61a are detachably connected to each other via the connection terminal 28c1. The battery case 28 is provided for each unit battery 25a, but may be provided to be capable of accommodating a plurality of unit batteries 25a. Battery cases which correspond to the right and left unit battery pairs 26a among the plurality of battery cases 28 may be referred to as right and left battery cases 28d (a pair of right and left battery support parts).

Figure 8:
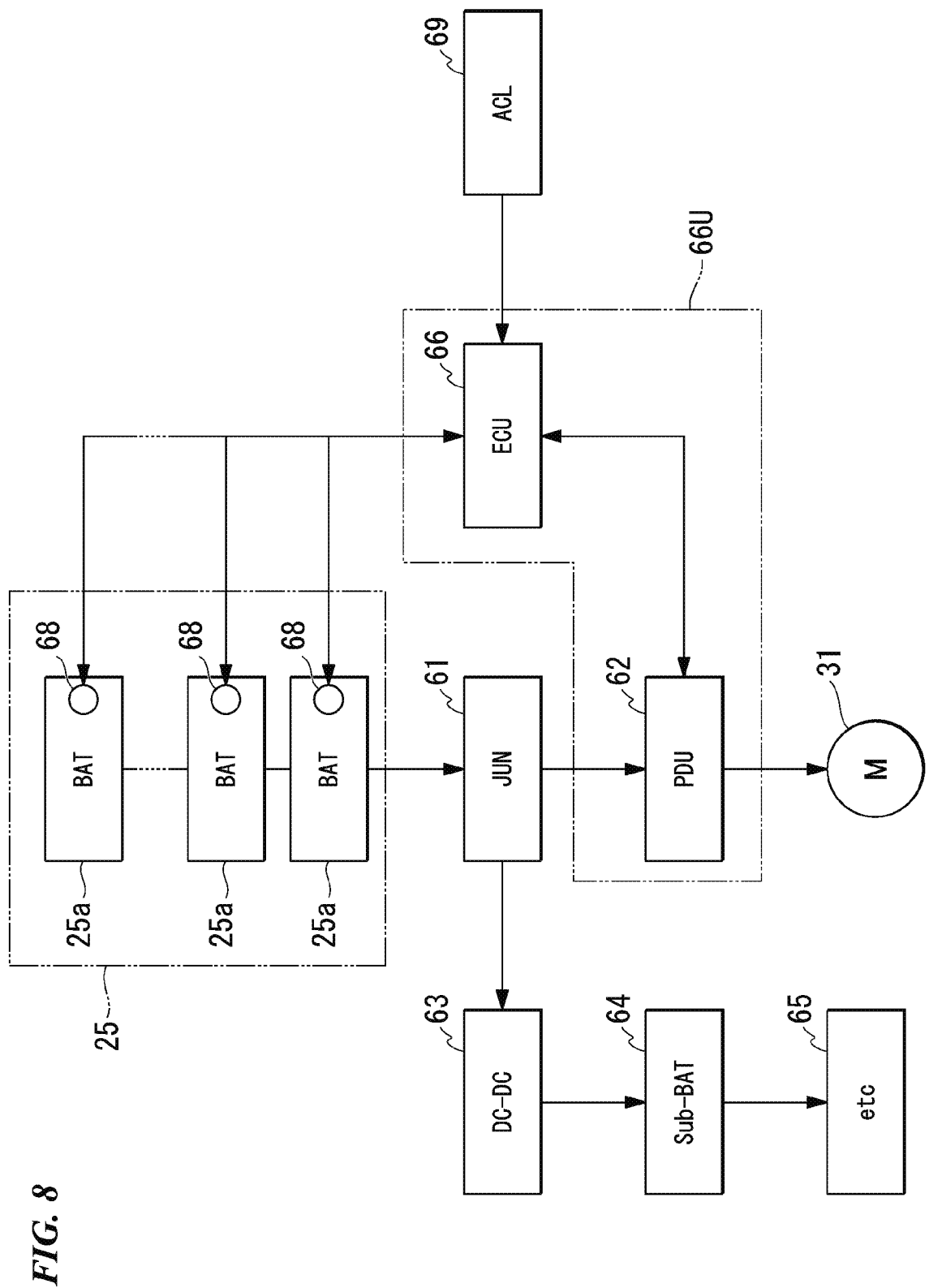
FIG. 8 is a block diagram showing a main configuration of the electric vehicle.

With reference to FIG. 4 and FIG. 8, electric power from the battery 25 is supplied to the PDU 62, which is a motor driver, via the junction box 61 having a contactor (not shown) that is interlocked with a main switch (not shown). The electric power from the battery 25 is converted from a direct current to a three-phase alternating current by the PDU 62 and is then supplied to the electric motor 31 which is a three-phase alternating current motor.

An output voltage from the battery 25 is stepped down via a DC-DC converter 63 and is supplied to a 12 V sub-battery 64, a general electric component 65 such as a lighting device, and a control system component such as the ECU 66.

The junction box 61 aggregates a plurality of unit wirings 61a that extends from each unit battery 25a, and the collective wiring 61b extends from the junction box 61 toward the PDU 62. The junction box 61 has a fuse corresponding to each unit wiring 61a in addition to the contactor.

The PDU 62 includes an inverter and controls power distribution to a stator winding of the electric motor 31. A heat sink is provided on the PDU 62.

For example, the unit battery 25a is charged by a charger that is connected to an AC 100 V electric power source in a state of being removed from the vehicle body. The electric vehicle 1 may be constituted to include a charger. The unit battery 25a includes a BMU (battery managing unit) 68 that monitors a charge and discharge status, a temperature, and the like. Information monitored by the BMU 68 is shared with the ECU 66 when the battery is attached to the vehicle body. Output request information from an accelerator sensor 69 is input to the ECU 66. The ECU 66 controls driving of the electric motor 31 via the PDU 62 on the basis of the output request information which has been input.

The plurality of unit wirings 61a that extend from each battery case 28 are connected to the junction box 61 between the unit battery pairs 26a. The collective wiring 61b extends rearward from a rear part of the junction box 61, and the collective wiring 61b is connected to the PDU 62. A three-phase cable 61c extends forward from the PDU 62. The three-phase cable 61c is routed to the left and is connected to the electric motor 31. The electric motor 31 performs a power running operation in accordance with a control by the PDU 62 and allows the electric vehicle 1 to travel.

As described above, the electric vehicle 1 in the above embodiment includes the seat 7 on which an occupant is seated, the pair of right and left unit battery pairs 26a of the battery 25 which are arranged in a distributed manner to the right and the left below the seat 7, and the pair of right and left battery cases 28d which are provided on the vehicle body and each of which detachably holds each of the right and left unit battery pairs 26a.

According to the configuration, since the unit battery pairs 26a are arranged in a distributed manner to the right and the left in a dead space below the seat 7, capacity of the battery 25 can be easily secured, and travel stability, particularly in a rolling direction, can be improved according to the distributed arrangement to the right and the left of the unit battery pairs 26a, which are heavy objects. Further, according to the distributed arrangement to the right and the left of the unit battery pairs 26a, heat radiation of the battery 25 can be dispersed, and heat source concentration of the battery 25 can be avoided. Further, the unit battery pairs 26a can be easily attached and detached from an outer side in the vehicle width direction, and mobilization of the battery 25 can be facilitated.

Further, in the electric vehicle 1 described above, the right unit battery pair 26a is detachable from the right battery case 28d by a slide in the right-to-left direction, and the left unit battery pair 26a is detachable from the left battery case 28d by a slide in the right-to-left direction.

According to the configuration, in comparison with a configuration in which the right and left unit battery pairs 26a are detachable by a movement in the vertical direction, the battery case 28 can easily receive a weight of the battery when the battery is attached and detached, and the attachment and detachment work of the battery 25, which is a heavy object, can be facilitated.

Further, the electric vehicle 1 described above includes the propeller shafts 45, 46 that extend in the front-to-rear direction on the inner side in the vehicle width direction, and the right and left unit battery pairs 26a are arranged to interpose the propeller shafts 45, 46 in the right-to-left direction.

According to the configuration, since the right and left unit battery pairs 26a are arranged in a distributed manner to the right and the left of the propeller shafts 45, 46 on the inner side in the vehicle width direction, an efficient layout of the right and left unit battery pairs 26a, particularly in a four-wheel drive vehicle, can be realized.

Further, the electric vehicle 1 described above includes the step floor 5 on which the occupant places his or her foot and the step frame 5a that supports the step floor 5, wherein the step frame 5a has the lower side portion 21a that is arranged on the outer side in the vehicle width direction of the right and left unit battery pairs 26a, and the rear upward extension portion 21c that is arranged behind the right and left unit battery pairs 26a continues behind the lower side portion 21a.

According to the configuration, since the right and left unit battery pairs 26a are arranged on the inner side in the vehicle width direction of the outer arrangement part (lower side portion 21a) of the step frame 5a and are arranged in front of the rear arrangement part (rear upward extension portion 21c), external disturbances to the right and left unit battery pairs 26a from the outside in the vehicle width direction and from the rear can be prevented by using the frame member including the step frame 5a.

Further, the electric vehicle 1 described above includes the electric motor 31 that is connected to the drive wheel (front and rear wheels FW, RW) and the second battery 27 that is arranged behind the seat 7, and at least part of the electric motor 31 is arranged between the seat 7 and the second battery 27.

According to the configuration, since the electric motor 31 is arranged adjacent to the right and left unit battery pairs 26a and the second battery 27, and the electric motor 31 is arranged to be surrounded by the plurality of unit batteries 25a, an efficient layout in which distances between the plurality of unit batteries 25a and the electric motor 31 are reduced can be achieved, and mass concentration can be achieved.

Further, in the electric vehicle 1 described above, at least part of the electric motor 31 is arranged below the seat 7, and the position in the front-to-rear direction of the electric motor 31 overlaps the right and left unit battery pairs 26a.

According to the configuration, since at least part of the electric motor 31 is arranged in the dead space below the seat 7, and the position in the front-to-rear direction of the electric motor 31 overlaps the unit battery pairs 26a below the seat 7, even in a small electric vehicle 1, the space below the seat 7 can be effectively used, the bulky electric motor 31 is deployable, and mass concentration can be achieved. Further, since the electric motor 31 and the unit battery pairs 26a which are heavy objects are arranged below the seat 7 that is arranged at the middle part in the front-to-rear direction of the vehicle, further mass concentration can be achieved.

Further, in the electric vehicle 1 described above, the electric motor 31 is arranged such that at least part (the lower part) of the electric motor 31 overlaps the side frame 12 of the vehicle body frame 10 in a side view and overlaps the cross frames 13a, 13b, and 13c of the vehicle body frame 10 in a front view.

According to the configuration, since the electric motor 31 and the vehicle body frame members are arranged to overlap each other in the side view and the front view, external disturbances to the electric motor 31 from the vehicle width direction and the front-to-rear direction can be prevented by using the vehicle body frame members.

Further, the electric vehicle 1 described above includes the distribution mechanism 35 that is coupled to the electric motor 31, and at least part of the distribution mechanism 35 is arranged below the seat 7.

According to the configuration, since at least part of the distribution mechanism 35 that is coupled to the electric motor 31 is arranged below the seat 7, the dead space below the seat 7 can be used further effectively. Further, since the seat 7 is arranged at the middle part in the front-to-rear direction of the vehicle, the distribution mechanism 35 which is a heavy object is arranged at the middle part in the front-to-rear direction of the vehicle, and further mass concentration can be achieved.

Further, the electric vehicle 1 described above includes the propeller shafts 45, 46 that extend in the front-to-rear direction of the vehicle from the distribution mechanism 35, and the electric motor 31 is arranged such that the output shaft 31a is directed in the front-to-rear direction of the vehicle.

According to the configuration, since the output shaft 31a of the electric motor 31 and the propeller shafts 45, 46 are arranged substantially parallel to each other, it becomes easy to connect between the electric motor 31 and the propeller shafts 45, 46 via the distribution mechanism 35, and it is possible to shorten a transmission path and efficiently transmit power. Further, the output shaft 31a of the electric motor 31 and the propeller shafts 45, 46 are arranged to be directed in the front-to-rear direction, and thereby, it is possible to reduce bulkiness in the vehicle width direction and achieve a compact arrangement.

Further, in the electric vehicle 1 described above, the propeller shafts 45, 46 and the output shaft 31a of the electric motor 31 are arranged to interpose the center line CL in the vehicle width direction in a plan view.

According to the configuration, since the propeller shafts 45, 46 and the output shaft 31a of the electric motor 31 are laid out to interpose the center line CL in the vehicle width direction, by the distributed arrangement of the propeller shafts 45, 46 and the electric motor 31 as a heavy object, the travel stability is improved, and the distribution mechanism 35 that connects between the electric motor 31 and the propeller shafts 45, 46 straddles the center line CL in the vehicle width direction, so that mass concentration can be achieved.

Further, in the electric vehicle 1 described above, the first rubber mount part 33M is provided between the electric motor 31 and the vehicle body frame 10, and the second rubber mount parts 37M, 38M are provided between the distribution mechanism 35 and the vehicle body frame 10.

According to the configuration, since the electric motor 31 and the distribution mechanism 35 are supported on the vehicle body frame 10 by the plurality of rubber mount parts 33M, 37M, and 38M, it is possible to enhance vibration proof properties of the drive apparatus 30.

Further, the electric vehicle 1 described above includes the pair of right and left battery connection terminals 28c1 which are provided on the inner side in the vehicle width direction of the right and left battery cases 28d and each of which is connected to each of the right and left unit battery pairs 26a.

According to the configuration, since the battery connection terminal 28c1 that is connected to each of the right and left unit battery pairs 26a is arranged to be directed inward in the vehicle width direction of the right and left battery cases 28d, it becomes difficult for external disturbances from the outside in the vehicle width direction to affect the battery connection terminal 28c1, and it is possible to satisfactorily protect the battery connection terminal 28c1.

Further, in the electric vehicle 1 described above, the pair of right and left unit wirings 61a each of which corresponds to each of the right and left unit battery pairs 26a are provided between the right and left battery cases 28d, the right unit wiring 61a is connected to the right battery connection terminal 28c1 from an inner side in the vehicle width direction of the right battery case 28d, and the left unit wiring 61a is connected to the left battery connection terminal 28c1 from an inner side in the vehicle width direction from the left battery case 28d.

According to the configuration, since the unit wiring 61a that reaches the battery connection terminal 28c1 is arranged on the inner side in the vehicle width direction of the right and left battery cases 28d, it is possible to satisfactorily protect a high voltage wiring.

Further, the electric vehicle 1 described above includes the junction box 61 that distributes the unit wirings 61a toward the right and left battery connection terminals 28c1, and the junction box 61 is arranged between the right and left battery cases 28d.

According to the configuration, since the junction box 61 is arranged between the right and left battery cases 28d, it is possible to achieve optimization of the wiring such as shortening the unit wirings 61a that extend from the junction box 61 to the right and left battery connection terminals 28c1.

Further, the electric vehicle 1 described above includes the control unit 66U that controls charging and discharging between the electric motor 31 and the right and left unit battery pairs 26a, wherein the control unit 66U is arranged behind the junction box 61, and the collective wiring 61b that extends between the junction box 61 and the control unit 66U, the three-phase cable 61c that extends between the control unit 66U and the electric motor 31, and the right and left unit wirings 61a are arranged in a region that is surrounded by the right and left battery cases 28d, the junction box 61, and the control unit 66U.

According to the configuration, since high voltage electrical wirings are arranged in a space that is surrounded by the right and left battery cases 28d, the junction box 61, and the control unit 66U, the electrical wirings are concentrated on the inner side in the vehicle width direction, it becomes difficult for external disturbances to affect the electrical wirings, and it is possible to satisfactorily protect the high voltage wirings.

The present invention is not limited to the above embodiment, and, for example, the electric vehicle may be not only a four-wheel vehicle but also a three-wheel vehicle (including a vehicle having two front wheels and one rear wheel in addition to a vehicle having one front wheel and two rear wheels).

The configuration in the above embodiment is an example of the present invention, and various modifications can be made without departing from the scope of the present invention, such as replacing a constituent element of the embodiment with a known constituent element.

DESCRIPTION OF THE REFERENCE SYMBOLS

1 Electric vehicle
5 Step floor
5a Step frame
7 Seat
10 Vehicle body frame
12 Side frame (vehicle body frame member)
13a Front cross frame (vehicle body frame member)
13b Rear cross frame (vehicle body frame member)
13c Intermediate cross frame (vehicle body frame member)
21a Lower side portion (outer arrangement part)
21c Rear upward extension portion (rear arrangement part)
25 Battery
25a Unit battery
26 First battery
26a Unit battery pair (battery)
27 Second battery
28 Battery case
28c1 Battery connection terminal
28d Battery case (battery support part)
31 Electric motor
31a Output shaft
33M, 37M, 38M Rubber mount part
35 Distribution mechanism (transmission mechanism)
45 Front propeller shaft
46 Rear propeller shaft
61 Junction box (distribution box)
61a Unit wiring (battery wiring)
61b Collective wiring (second wiring)
61c Three-phase cable (third wiring)
66U Control unit (control part)
FW Front wheel (drive wheel)
RW Rear wheel (drive wheel)
CL Vehicle body right-to-left center (center line)

What is claimed is:

1. An electric vehicle comprising:
an electric motor that is connected to a drive wheel;
a seat on which an occupant is seated;
a pair of right and left batteries that are arranged in a distributed manner to a right and a left below the seat;
a pair of right and left battery support parts which are provided on a vehicle body and each of which detachably holds each of the right and left batteries; and
a second battery that is arranged behind the seat,
wherein at least part of the electric motor is arranged between the seat and the second battery,
at least part of the electric motor is arranged below the seat, and
a position in a front-to-rear direction of the electric motor overlaps the pair of right and left batteries.

2. The electric vehicle according to claim 1,
wherein the right battery is detachable from the right battery support part by a movement in a right-to-left direction, and the left battery is detachable from the left battery support part by a movement in a right-to-left direction.

3. The electric vehicle according to claim 1, comprising a propeller shaft that extends in a front-to-rear direction on an inner side in a vehicle width direction,
wherein the right and left batteries are arranged to interpose the propeller shaft in a right-to-left direction.

4. The electric vehicle according to claim 1, comprising:
a step floor on which an occupant places his or her foot; and
a step frame that supports the step floor,
wherein the step frame has an outer arrangement part that is arranged on an outer side in a vehicle width direction of the right and left batteries, and a rear arrangement part that is arranged behind the right and left batteries continues behind the outer arrangement part.

5. The electric vehicle according to claim 1, comprising:
a junction box that is arranged between the pair of right and left battery support parts and that distributes a unit wiring toward a connection terminal of the pair of right and left batteries; and
a control unit that is arranged behind the junction box and that controls charging and discharging between the electric motor and the pair of right and left batteries,
wherein a collective wiring that extends between the junction box and the control unit is arranged in a region that is surrounded by the pair of right and left support parts, the junction box, and the control unit.

\* \* \* \* \*